(12) United States Patent
Dice

(10) Patent No.: US 6,854,048 B1
(45) Date of Patent: Feb. 8, 2005

(54) SPECULATIVE EXECUTION CONTROL WITH PROGRAMMABLE INDICATOR AND DEACTIVATION OF MULTIACCESS RECOVERY MECHANISM

(75) Inventor: David Dice, Foxborough, MA (US)

(73) Assignee: Sun Microsystems, Santa Clara, CA (US)

(*) Notice: Subject to any disclaimer, the term of this patent is extended or adjusted under 35 U.S.C. 154(b) by 542 days.

(21) Appl. No.: 09/924,891

(22) Filed: Aug. 8, 2001

(51) Int. Cl.[7] .............................................. G06F 9/312
(52) U.S. Cl. ...................... 712/216; 711/147; 711/210; 712/225
(58) Field of Search ................................ 711/147, 210; 712/216, 225, 23, 239

(56) References Cited

U.S. PATENT DOCUMENTS

| | | | |
|---|---|---|---|
| 4,908,750 A | | 3/1990 | Jablow .................... 718/103 |
| 5,228,131 A | * | 7/1993 | Ueda et al. ................ 712/240 |
| 5,611,063 A | * | 3/1997 | Loper et al. ............... 712/205 |
| 5,615,350 A | * | 3/1997 | Hesson et al. ............. 712/218 |
| RE36,462 E | | 12/1999 | Chang et al. .............. 711/209 |

OTHER PUBLICATIONS

Bershad, Brian et al. "Fast Mutual Exclusion for Uniprocessors", ACM Sigplan Notices: vol. 27, Issue 9 (Sep. 1992).

* cited by examiner

Primary Examiner—Kenneth S. Kim
(74) Attorney, Agent, or Firm—Barry W. Chaplin, Esq.; Chapin & Haung, LLC (57) ABSTRACT

Mechanisms and techniques operate in a computerized device to enable or disable speculative execution of instructions such as load instructions on one or more processors in the computerized device. The mechanisms and techniques can execute a set of instructions on a processor in the computerized device and can detect a value of a speculation indicator. If the value of the speculation indicator indicates that speculative execution of load instructions is allowed in the computerized device, the mechanisms and techniques allow speculative execution of load instructions in the processor, whereas if the value of the speculation indicator indicates that speculative execution of load instructions is not allowed in the computerized device, the mechanisms and techniques do not allow speculative execution of load instructions in the processor. An instruction in code can turn on and off the speculation indicator, which can be one or more bits in a control register or in page table entries associated with pages of memory. Under certain conditions, speculative execution correction mechanisms can be enabled, disabled or removed from a processor.

16 Claims, 6 Drawing Sheets

SPECULATIVE EXECUTION CONTROL WITH PROGRAMMABLE INDICATOR AND DEACTIVATION OF MULTIACCESS RECOVERY MECHANISM

FIELD OF THE INVENTION

The present invention generally relates to systems for executing instructions in a central processing unit within a computerized device, and more particularly, to systems and techniques that selectively control operation of an ability to speculatively execute load instructions prior to the operation of store instructions.

BACKGROUND OF THE INVENTION

Conventional computerized devices include a processor (e.g., microprocessor) that is capable of executing machine language instructions stored in a memory system within the computerized device. A collection of such machine language instructions in the memory system can form a computer program or software application. A software developer may use a text editor to write the computer program in a low-level language such as assembly language. The software developer can then processes the assembly language with a program called an assembler to convert the assembly language instructions into machine language instructions that the processor can natively execute. Alternatively, a software developer can write a software application using a high-level language such as C or C++ and can operate a program called a compiler which reads the C or C++ code and which automatically generates assembly level instructions which the compiler (or another program such as a linker) then assembles into machine language instructions that the processor can execute. Assembly language statements or instructions and their machine language counterparts thus represent the lowest level of programming that a software developer or a compiler can create that can then be executed by a processor in a computerized device.

Some compilers are equipped with a capability of producing optimized code. As an example, depending upon the target processor for which a compiler is generating code, the compiler may reorder certain instructions in the code such that when the target processor executes such re-ordered instructions, the target processor will execute them somewhat faster than if they had not been reordered due to the optimization feature of the compiler. Optimizing compilers thus attempt to arrange instructions in a more optimal manner for the faster execution on the target processor. Optimization processing may determine that certain instructions should be placed ahead of others, even though the original high-level software code might have indicated a different order for the high-level instructions that map or correspond to the re-ordered low level machine instructions.

As an example or how an optimization procedure might reorder instructions, consider the following fragment of C code:

*ptr1=a;
b=*ptr2;

The first statement "*ptr1=a" indicates that the value of variable "a" should be stored at a memory location identified by pointer 1 (*ptr1). The second statement "b=ptr2" indicates that a value of variable "b" should be set to the contents of memory loaded from a memory location referenced by pointer 2 (*ptr2). For one type of microprocessor, a compiler might compile the aforementioned fragment of C code into the following assembly language or machine language equivalent set of instructions:

store R1->[R2]
load [R3]->R4.

Upon execution by the target processor, the "store" instruction causes the target processor to place the contents of register R1 (i.e., containing the value of variable "a") into a memory location defined in register R2. In other words, the store instruction causes the target processor to write a value to memory. The "load" instruction causes the target processor to obtain data from memory at the location defined in register R3 and to place this data into register R4 (which represents the "B" variable). That is, the load statement causes the target processor to read a value from memory.

Due to the nature of how instructions are executed in certain target processors, it might be preferable (i.e., faster) for the target processor to begin execution processing of a load instruction prior to a store instruction which appears before a load instruction in the code. This may be the case, perhaps, because the target processor requires more processing cycles to completely execute a load instruction whereas a store instruction might take fewer cycles to execute. Another reason to perform a load before a store might be that internal processor resources used by the load instruction, such as a memory channel, might be available before the store instruction but might not be available immediately after the store instruction. Accordingly, if the target processor can begin execution of the load instruction first, followed by the store instruction, the net result might be that both instructions are executed in a shorter total amount of time as compared to if these instructions had been executed in the original order shown above.

Some optimizing compilers are aware of this fact and may thus automatically reorder the instructions during compiling of the high level language source code such that the load instruction precedes the store instruction in the machine language code. In other cases, a compiler may be unaware of efficiencies gained from reordering such instructions and the processor itself may reorder the instructions during its instruction execution procedure (i.e., during runtime). In such cases, as the processor encounters a store instruction followed by a load instruction, the processor may be configured to reorder the instructions so that the processor always execute the load before the store regardless of the order in which the compiler originally arranged the instructions.

In either instance, where either the compiler or the processor reorders load and store instructions, certain problems may arise.

Referring to the example store and load code shown above, suppose that R2 and R3 happen to refer to the same memory address. In such cases, moving the load prior to the store instruction will result in the store instruction fetching an incorrect value. This problem is called a read-after-write (RAW) hazard. Certain optimizing compilers that are capable of reordering load and store instructions can attempt to perform an alias analysis technique on the code in an attempt to determine, at compile time, if R2 and R3 are disjoint or distinct from each other (i.e., that a read-after-write hazard does not exist). In some cases, the alias analysis technique used by such compilers can break down and cannot guarantee that R2 and R3 are disjoint. When alias analysis fails, for reasons of safety and correctness, the compiler must be conservative and forgo reordering the load and store instructions.

Alternatively, some compilers are equipped to produce code that performs an explicit check at runtime to determine if R2 and R3 are disjoint. During runtime, if such explicit checking code determines that the R2 and R3 memory references are unique (i.e., are distinct), then the code follows an execution path in which the load instruction is executed prior to the store instruction (i.e., the load and store are reordered to improve execution speed). If the explicit check code determines that memory references associated with R2 and R3 are possibly related to one another, then the code marks one of the memory references as "volatile" and the processor is not permitted to execute the load instruction prior to the store instruction when this volatile memory reference is used in such instructions.

If a conventional processor performs reordering of load and store instructions during runtime execution of code in order to increase performance, the processor can include circuitry that can check for read-after-write hazards within itself after reordering and executing the reordered load and store instructions. In other words, the processor can "speculatively" execute load instructions before store instructions and can then perform a read-after-write hazard check after the fact to determine if the load store processing occurred without memory reference errors. If the processor determines that a read-after-write hazard did occur, the processor can reset its state as it existed just before the reorder operation and can then re-execute that portion of code in the original order by first executing the store instruction followed by the load instruction. As an example, upon detecting a read-after-write hazard, the processor can re-execute the offending instructions in program order (i.e., in the order in which they appear in the program), or the processor can discard a speculative state associated with the load instruction and can reissue the load instruction for execution along with any instructions that were dependent upon the load.

When a processor reorders a load instruction to execute prior to a store instruction and then performs read-after-write hazard checking, this processing is not visible to the executing program. In other words, from the programmer's perspective, the processor appears to have executed the instruction in program order as produced by the complier. Processor designers have determined that in most cases a load instruction can be reordered to execute before a store instruction without incurring a read-after-write hazard. As such, conventional wisdom is that better execution performance is obtained by having processors perform such reorder operations while only occasionally incurring the performance penalty of having to undo and re-execute the instructions in the original order.

The aforementioned load and store reordering techniques may be used in conventional uniaccess execution environments comprising a single processor, or in which a computerized device includes multiple processors that processes that do not access regions of memory related to one another. Uniaccess execution environments may also include multi-processor computer systems in which different threads of a process are constrained or bound to a single processor or in which different processes that share memory are constrained to execute on the same processor. Such example configurations are referred to herein as uniaccess execution environments.

Other computerized devices include multiple concurrently operating processors. In a multiaccess execution environment, different software processes may concurrently execute on different processors, or a single multi-threaded process may execute by having different threads concurrently execute on different processors (e.g., in a multiprocessor equipped computer system). A multiaccess execution environment includes memory such as shared memory or other memory that is potentially accessible by the different threads of the multi-threaded process or by different concurrently and/or simultaneously operating processes. In other words, a multiaccess execution environment is one in which the same memory location may potentially be accessed by two different portions of processing code (e.g., threads or processes). Multiaccess execution environments thus afford the ability to allow simultaneous (e.g., in multiprocessor computer systems) access to the same region of memory by different threads or processes. Two processes or threads might require access to the same memory area for example to allow such processes or threads to synchronize with each other.

One conventional synchronization scheme is known as Dekker's Algorithm and begins operation in a process by using a store instruction followed by a load instruction. As discussed above, if a compiler or one of the processors operating such a process or thread attempts to optimize execution of the Dekker's Algorithm store/load code by reordering the load instruction to execute before the store instruction, the algorithm can fail to maintain synchronization between processes or threads in a proper manner. In multiaccess execution environments then, a more complicated version of the read-after-write hazard can exist in which two different processes may contain store and load instructions that reference a common memory location (i.e., that are non-disjoint) and thus reordering in such cases should not be allowed. The problem is thus how to be able to reorder and execute load instructions before store instructions to gain the performance benefit while still being able to detect memory references between multiple processes.

Some conventional processors, such as Intel's 32-bit Pentium line of microprocessors (manufactured by Intel Corporation, Pentium being a registered trademark of Intel Corporation), solve this problem by providing a structure (e.g., circuitry) called a memory order buffer or MOB. The memory order buffer operates in a processor to track or "snoop for" write accesses to shared memory locations performed by other processors, for any shared memory addresses that the processor (i.e., the processor operating the memory order buffer) has previously speculatively read. If the processor using the memory order buffer detects any of such writes from other processors to previously speculatively read memory addresses, the processor is said to have detected a "memory ordering violation." To overcome this violation, the processor can use the memory order buffer to cancel or restart the affected reads as well as all speculative actions that might have depended on those reads. Like the read-after-write recover circuitry discussed above (i.e., for uniaccess execution environments), the operation of the memory order buffer is inaccessible to a programmers and is thus invisible to the executing program's operation.

Other conventional processors such as Intel's 64-bit IA-64 line of microprocessors, of which the Itanium is a member, provide another structure called an Advanced Load Address Table (ALAT) that permits a compiler to explicitly "move up" or advance loads before other instructions (e.g., before stores) to permit the loads to execute earlier than would otherwise be possible. The ALAT is visible to the programmer and to the executing program. As such, the compiler must explicitly reorder the load instruction before the store instruction, as the processor containing the ALAT will not do so on its own. Since the compiler reorders these instructions for a target processor containing an ALAT, the compiler also produces special "check code" that is inserted into the code after reordering the load and store instructions. The purpose of the check code is to consult the ALAT to make sure that a value returned by an "advanced" (i.e., reordered) load instruction is still coherent. If the check code detects a memory violation, the code branches to a recover operation in order to correct the memory violation problem. The ALAT mechanism is also responsible for performing the read-after-write hazard checking discussed above.

SUMMARY OF THE INVENTION

Conventional techniques and mechanisms employed in processors and compilers to control and recover from speculative reordering and execution of instructions (i.e., speculation) suffer from a number of deficiencies.

In particular, for processors that use implicit and automatic speculation, the programmer has no control over when a processor performs speculation. As a result, the processor speculatively reorders and executes all instructions such as loads and stores that can be speculatively executed, even in situations where a read-after-write hazard or other memory violation occurs. When such hazards occur, the processor must then, after the fact, consume resources such as processing cycles and memory bandwidth to recover from the read-after-write hazard or memory reference violation (e.g., via the use of an memory order buffer). This can reduce program execution performance when, for example, a programmer intentionally writes code (e.g., assembly language) that includes a store instruction followed by a load instruction and desires that the instructions be executed in that specific order. Perhaps the instructions reference a common memory location and the programmer intends this to be the case. However, even though the programmer explicitly writes the code with the intention that the store is to be executed prior to the load, conventional processors that employ implicit and automatic speculation will reorder the instructions nonetheless which results in the occurrence of a hazard and incurs the performance loss of having to recover from this hazard.

Another disadvantage of conventional processors is that the use of a memory order buffer to recover from memory access or other memory order violations is an expensive processor resource. When the processor must use the memory order buffer to recover from such a violation, the memory order buffer processing can significantly slow down the execution of a program. In addition, a memory order buffer is a complex structure that consumes processor die area (e.g., processor real estate) and assume a snoop-based cache coherence scheme to detect memory order violations. Because of interconnect traffic, snoop-based systems do not scale well to large number of processors.

In IA-64 processor architectures that provide an Advanced Load Address Table, the compiler must explicitly provide speculative reordering of load and store instructions and must further provide extensive checking and recover code which is inserted into the code of the software application (in addition to the code generated to perform the operation of that application) in order to utilize the ALAT to handle hazard or memory order violations. In other words, the compiler assumes that the instructions can be reordered and generates code containing the reordered instructions in addition to the code required to back out of a hazard situation using the ALAT. In situations where no memory order violation has occurred, performing the check code consumes valuable processor resources.

The present invention provides an alternative arrangement for controlling speculative reordering and execution of instructions such as load and store instructions in both uniaccess and multiaccess execution environments. Embodiments of the invention provide a processor design that includes a speculative execution controller. The speculative execution controller is capable of allowing or not allowing the processor to speculatively reorder store and load instruction sequences depending upon the value of a speculation indicator that the speculative execution controller can access.

A programmer or a compiler can include, for example, an instruction in the code to be executed that can set or unset the speculation indicator on an as needed basis. If the speculation indicator is set, the speculative execution controller can allow the processor to speculatively execute instructions, such as by allowing execution of loads before stores. In a computerized device that operates a uniaccess execution environment, the speculative execution controller can disable operation, for example, of the memory order buffer while the speculation indicator is set thus conserving power consumption and processing resources thus possibly improving throughput. In situations that might produce a hazard or memory violation as a result of speculative reordering and execution instructions such as load and store instructions, the programmer or a compiler can produce an instruction to turn off or unset the speculation indicator. When the speculation indicator is unset or is off, the speculative execution controller does not permit the processor to speculatively execute loads before stores. In this manner, embodiments of the invention provide an extremely fine level of control over when speculative execution of instructions such as load and store operations is or is not permitted in a processor.

The speculation indicator can be, for example, one or more bits within a processor control register or in a page table associated with a respective page of memory. In embodiments that provide a speculation indicator as one or more bit settings within a processor control register, the bit setting(s) can be set or unset (i.e., turned on or off or set to a specific value if more than one bit) via a dedicated set speculation indicator instruction (e.g., SET SI), or via an XOR or similar operation to XOR an appropriate value with the contents of the control register to adjust the setting of the speculation indicator. In this manner, embodiments of the invention can provide tight control of when speculative execution of load instructions is allowed in a processor.

In embodiments that provide a speculation indicator as one or more bits within with one or more respective page table entries, the speculation indicator can be one or more control bits associated with one or more pages of memory such as a code page containing the load instruction, a code page containing the store instruction, a data page containing (or referenced by) the load instruction, or a data page containing (or referenced by) the store instruction or any combination thereof. If the speculation indicator bit(s) for a particular page of memory is/are set (i.e., is/are on or set to some value), then the speculative execution controller allows the processor to speculatively reorder and execute load and store instructions for any instructions in code and/or data contained within that (or those) page (or pages) in memory. Accordingly, certain pages in memory can have the speculation indicator set to "on" in their page table entry to allow speculative execution of instructions such as loads in code residing in (or in data contained in) those pages in memory while other pages in memory can have their associated speculation indicator set to "off," in which case the processor is not allowed to speculatively execute instructions such as loads in the code existing within those pages in memory, or for data referenced in those pages by load and/or store instructions.

In addition, for processors designed for dedicated uniaccess execution environments, if such processors are configured in accordance with embodiments of the invention, a memory order buffer can be completely eliminated from the processor architecture thus saving (or making available for other uses) processor die area or transistor count and reducing processor manufacturing costs and power consumption.

Embodiments of the invention thus provide techniques and mechanisms for controlling speculative execution of load instructions in a computerized device. In particular, one embodiment provides a processor configured to control speculative execution of load instructions by performing steps or operations associated with method embodiments of the invention. The processor comprises an instruction orderer configured to receive and order a set of instructions for execution in the processor. An instruction executer is coupled to the instruction orderer and is configured to execute instructions in the set of instructions according to an order indicated by the instruction orderer. A speculative execution controller is coupled to one or both of the instruction orderer and the instruction executer and is coupled to access a speculation indicator. The speculative execution controller is configured to detect the value of the speculation indicator and is configured to allow speculative execution of load instructions in the processor if the value of the speculation indicator indicates that speculative execution of load instructions is allowed in the processor, and is configured to not allow speculative execution of load instructions in the processor if the value of the speculation indicator indicates that speculative execution of load instructions is not allowed in the processor.

In another embodiment, the processor includes a speculation indicator configured to receive and maintain a value that indicates if speculative execution is allowed of load instructions is allowed in the processor.

Other embodiments of the invention include a computerized device, workstation, handheld or laptop computer, or the like configured with software and/or circuitry (e.g., a processor as summarized above) to process any or all of the method operations disclosed herein as embodiments of the invention. In other words, a computerized device or a processor that is programmed or configured to operate as explained herein is considered an embodiment of the invention.

Other embodiments of the invention that are disclosed herein include software programs to perform the method embodiment steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein as embodiment of the invention. Such arrangements of the invention are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments of the invention.

It is to be understood that the system of the invention can be embodied strictly as a software program, as software and hardware, or as hardware alone such as a processor. Example embodiments of the invention may be implemented within computer systems, processors, and computer program products and/or software applications manufactured by Sun Microsystems Inc. of Palo Alto, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Embodiments of the invention provide mechanisms and techniques for controlling speculative reordering and execution of instructions, such as load and store instructions, in both uniaccess and multiaccess computing system execution environments. Embodiments of the invention provide a processor design that includes a speculative execution controller. The speculative execution controller is capable of controlling speculative execution of instructions in the processor by allowing or not allowing the processor to speculatively reorder and execute instruction sequences depending upon the value or setting (i.e., on or off, true of false, 1 or 0, or another value) of a speculation indicator. In other words, if the speculation indicator is enabled, is set, or is otherwise in an "on" or "1" state, the speculative execution controller allows the processor to speculatively execute instructions. Conversely, if the speculation indicator is disabled, is unset, or is otherwise in an "off" or "0" state, the speculative execution controller does not allow the processor to speculatively execute instructions. A programmer or a compiler (via software code) or an operating system can control operation of the speculative execution controller in the processor by including, for example, an instruction in program or operating system code that can set or unset the value of the speculation indicator on an as needed basis.

A brief overview of example situations in which embodiments of the invention can operate is provided below, followed by a more detailed description of specific embodiments of the invention presented thereafter.

In this first example, assume that a processor includes a speculative execution controller and further includes access to (i.e., an ability to read) a speculation indicator within the computerized device that is set to "on." The speculation indicator may be set or turned on when the processor previously executes an instruction in software code to turn on the speculation indicator. In such situations, the speculative execution controller allows the processor, for example, to speculatively execute load instructions. The code might also contain an instruction to unset or turn off the speculation indicator. In such cases, the speculative execution controller does not allow the processor to speculatively execute load instructions.

In one embodiment of the invention that operates in a uniaccess execution environment, when the speculation indicator is "on", the speculative execution controller can also disable operation of a multiaccess speculative execution correction mechanism such as a memory order buffer in the processor, since this mechanism is not required for operation in a uniaccess execution environment. A processor equipped with this embodiment of the invention can thus conserve power and processing resources due to the disablement of the multiaccess speculative execution correction mechanism. In this example, the processor can still perform read-after-write hazard checking in order to ensure that any speculatively executed load instructions do not cause read-after-write hazards. The read-after-write hazard checking thus operates as a safety net in case the code that the compiler or programmer produces incurs an read-after-write hazard when load instructions are speculatively executed.

In situations that are known to the compiler or to a programmer to produce a read-after-write hazard, the programmer or a compiler can provide an instruction in the code to turn off or unset the speculation indicator, thus causing the speculative execution controller to not allow the processor to speculatively execute load instructions before store instructions. As such, the processor will not reorder and speculatively execute loads before stores and will avoid having to perform read-after-write hazard checking and correction measures.

According to another example embodiment of the invention, in situations involving a uniaccess execution environment, when the speculation indicator is "on", the speculative execution controller can disable operation of all speculative execution correction mechanisms. As an example, the speculative execution controller can disable both the memory order buffer and read-after-write hazard checking in the processor. Doing so thus places total reliance on the accuracy of the programmer or the compiler to produce code that does not contain instructions that, if speculatively executed, produce read-after-write hazards. Use of this embodiment of the invention is not recommended unless a programmer is absolutely sure that the code will always operate in a uniaccess execution environment and will not incur a read-after-write hazard if load instructions are speculatively executed.

As another example of the use of another embodiment of the invention, consider a multiaccess environment in which multiple processors can concurrently execute different processes or can concurrently execute multiple threads of a multi-threaded process. In such a multiaccess execution environment, a programmer or a compiler can provide a "set speculation indicator" instruction to turn on the speculation indicator (i.e., an instruction in the code), for example, in situations where a process operating on one of the processors in the multiaccess execution environment has only one thread and that thread does not access any region of memory accessible simultaneously from multiple processors (e.g., shared memory). In such cases, the programmer or compiler is "aware" that this process is "self contained" and thus memory violations from access to shared read-write memory will not occur. By turning on the ability to speculatively execute load instructions prior to store instructions, process execution speed may be increased. In addition, the speculative execution controller in this example embodiment of the invention can be configured such that when the speculation indicator is "on", the speculative execution controller disables any multiaccess speculative execution correction mechanism(s) such as a memory order buffer.

As another example of the use of embodiments of the invention in a multiaccess execution environment, if a process has multiple threads but all of the threads are bound to a single processor in the multiaccess environment and none of the threads have access to shared read-write memory, then the programmer and/or the compiler can turn on the speculation indicator so that the speculative execution controller can allow the processor to speculatively execute load instructions. However, for multiaccess execution environments, if there is any chance that threads on different processors can simultaneously access shared read-write memory, a programmer and/or a compiler should turn off the speculation indicator such that memory violations do not occur.

When the speculation indicator is unset or is off, the speculative execution controller does not permit the processor to speculatively execute loads before stores. In this state (i.e., speculation not allowed), the speculative execution controller can also disable all speculative execution correction mechanisms in the processor since they are not required when speculative execution is not allowed. This can allow the processor to consume less power and may increase processor performance. Embodiments of the invention thus provide a fine level or granularity of control over when speculative execution of load and store operations is or is not permitted in a processor.

Figure 1:
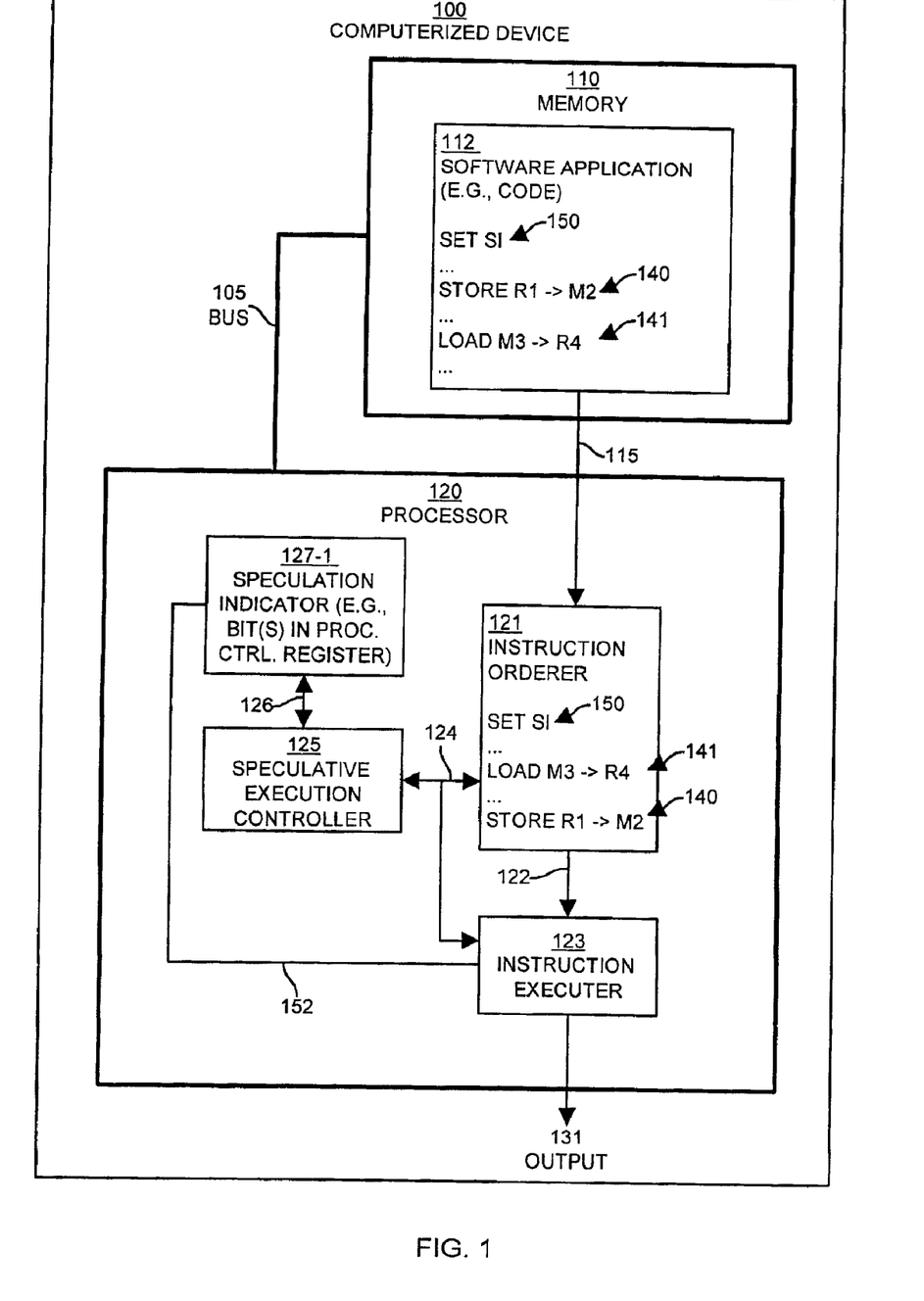
FIG. 1 illustrates an example architecture of the computerized device configured in accordance with one embodiment of the invention.

FIG. 1 illustrates an example architecture of a computerized device 100 configured according to one embodiment of the invention. The computerized device 100 includes a bus 105 that couples a memory 110 and a processor 120. The bus 105 can be any type of data bus, circuitry or other interconnection mechanism which allows the processor 120 to access the memory 110. The memory 110 may be any type of computer readable medium such as random access memory (RAM) and may be shared or unshared by other processes. The processor 120 may be any type of microprocessor, central processing unit, or other circuit that can process application instructions as explained herein. Examples of the processor 120 include the Scalable Processor ARChitecture (SPARC) family of microprocessors manufactured by Sun Microsystems Inc. of Palo Alto, Calif., USA. It is intended herein that the term processor may also include other types of circuitry that can perform or otherwise speculatively order and/or execute instructions as well, such as a Field Programmable Gate Array (FPGA), an Application Specific Integrated Circuit (ASIC), or other such circuitry. The computerized device 100 can be any type of electronic device such as a personal computer, workstation, handheld computing device, dedicated computing device or the like.

The memory 110 is encoded with a software application 112 which is software code (e.g., object code or machine language statements) that includes a set of instructions that the processor 120 can execute. In this example, the software application 112 includes a set speculation indicator "SET SI" instruction 150 which precedes a store instruction 140 that is then followed in the code by a load instruction 141. Note for this example that the store instruction 140 appears or comes before the load instruction 141 in the code. A compiler operating according to one embodiment of the invention may automatically create the software application 112 by compiling source code written in a high-level language, or a programmer may write the code of the software application 112 by hand using an editor or other code development mechanism.

In this embodiment of the invention, the processor 120 includes an interconnection of an instruction orderer 121, an instruction executor 123, a speculative execution controller 125 and a speculation indicator 127-1. According to the general operation of the processor 120, the instruction orderer 121 is configured to access 115 (e.g., over the bus 105) the instructions in the software application 112 and can order those instructions for execution by the instruction executor 123. As discussed above however, in some cases, the processor 120 may be able to execute the software application 112 faster by having the instruction orderer 121 reorder certain instructions for execution ahead of others, such as by reordering the load instruction 141 to execute before the store instruction 140. Once ordered, the instruction executor 123 receives 122 the ordered instructions and executes the instructions in the prescribed order to produce an output 131. The output 131 represents the results of executing the software application 112. Details of the operation of the example embodiment of the invention illustrated in FIG. 1 will now be provided with respect to the flow chart of processing steps shown in FIG. 2.

Figure 2:
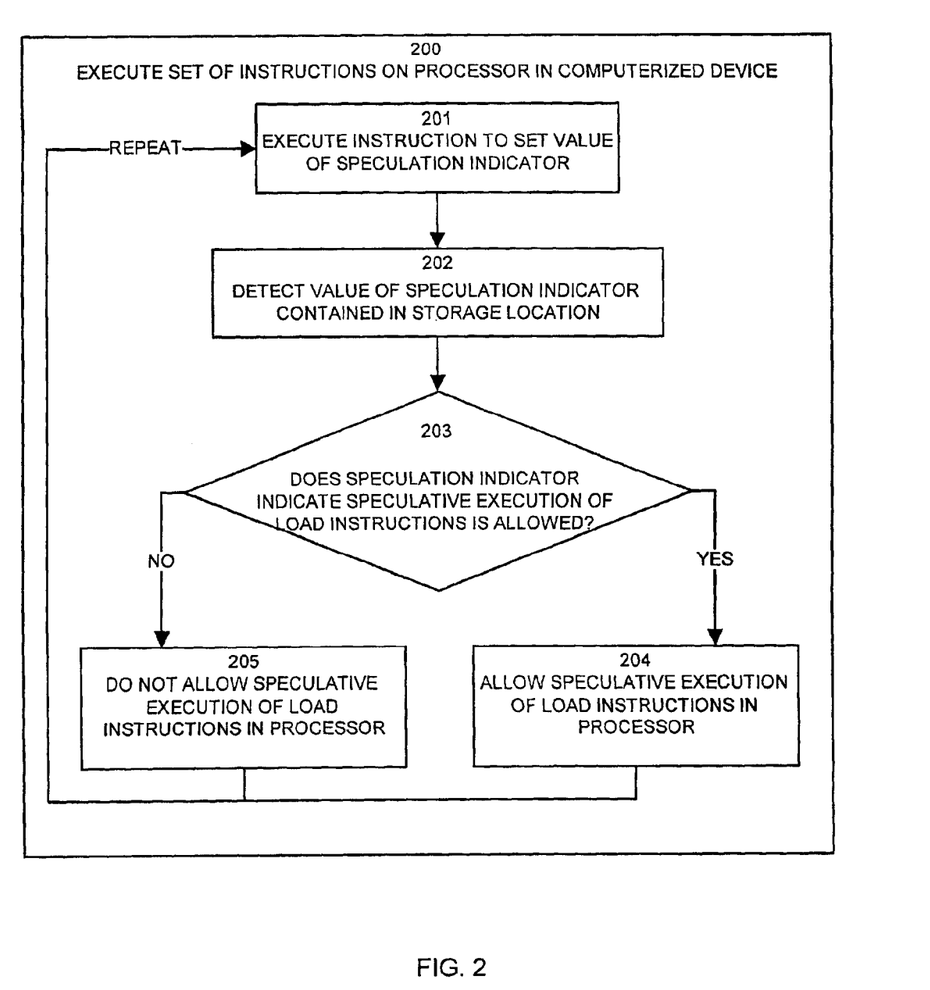
FIG. 2 is a flow chart of processing steps performed according to one embodiment of the invention to control a processor's ability to speculatively execute load instructions.

FIG. 2 is a flow chart of processing steps performed by a processor 120 configured in accordance with one embodiment of the invention to control speculative execution of load instructions in the computerized device 100. During the description of the processing steps shown in FIG. 2, reference will be made to the example embodiment of the invention illustrated in FIG. 1.

In step 200, the processor 120 executes a set of instructions on the processor 120 in the computerized device 100. As shown with respect to the illustration in FIG. 1, the instruction orderer 121 and instruction executor 123 are configured to perform ordering and execution of instructions existing within the software application 112, as briefly explained above. The remaining steps 201 through 205 shown in FIG. 2 operate during the general process of executing the software application 112 shown by step 200.

In step 201, the processor 120 executes a set speculation indicator instruction 150 to set a value of the speculation indicator 127-1 in the computerized device 100. With particular reference to the example in FIG. 1, of the three instructions 150, 140, 141, the first instruction "SET SI" (SET Speculation Indicator) 150 is thus an instruction that a compiler or a programmer can insert in the code of the software application 112 to control the setting of the speculation indicator 127-1. In step 201, the instruction orderer 121 passes 122 the SET SI instruction 150 to the instruction executer 123 which causes the instruction executor 123 to set (as shown by connection 152) the speculation indicator 127-1 to an "on" or set state. In an alternative embodiment of the invention, the speculative execution controller 125 can detect the SET SI instruction 150 and can adjust (i.e., set or unset) the value of the speculation indicator as specified by the instruction 150.

The speculation indicator 127-1 serves as a signal for the speculative execution controller 125 to control 124 whether or not the instruction orderer 121 is allowed to reorder store and load instructions such as 140 and 141 from the order in which they exist in the software application 112. Alternatively, also as illustrated in FIG. 1, the speculative execution controller 125 can control 124 whether or not the instruction executor 123 is allowed to speculatively execute a load instruction such as 141 which the instruction orderer 121 speculatively reorders before a store instruction 140. In other words, the speculative execution controller 125 is coupled to one or both of the instruction orderer 121 and/or executer 123 to enable or disable speculative execution of load instructions based on the setting of the speculation indicator 127-1.

In the example in FIG. 1, the speculation indicator 127-1 can be a value represented by one or more bits within a processor control register. The speculation indicator bit setting can be set or unset (i.e., turned on or off) via a simple XOR operation, such as by XOR'ing an appropriate value with the contents of the control register to alter the setting of the speculation indicator 127-1. Alternatively, as illustrated in this example, a dedicated SET SI instruction 150 can be included in the code from an instruction set available during the creation (e.g., compiling) of the software application 112. The dedicated SET SI instruction 150 can be used to set or unset the value of the speculation indicator 127-1 as needed by the software application 112. As will be explained later, the speculation indicator 127 can be a binary value, or may contain a range of values indicating different operational modes in which speculative execution of load instructions is enabled or disabled. In this manner, embodiments of the invention provide extremely tight control of when speculative execution of load and store instructions can be performed in the processor 120.

Next, in step 202, the speculative execution controller 125 detects (e.g., reads or otherwise accesses) a value of the speculation indicator 127-1. In the example illustrated in FIG. 1, the value of the speculation indicator 127-1 is set to a positive or true value which the speculative execution controller 125 detects in step 202.

Next, in step 203, the speculative execution controller 125 determines if the speculation indicator 127-1 indicates that speculative execution of load instructions is allowed in the computerized device 100. With respect to the example in FIG. 1, since the SET SI instruction 150 sets the speculation indicator 127-1 to an enabled, set or "on" state or value, the speculative execution controller 125 in step 203 determines that the speculation indicator 127-1 indicates that speculative execution of load instructions is to be allowed in the processor 120. Accordingly, processing proceeds to step 204.

In step 204, the speculative execution controller 125 allows speculative execution of load instructions in the processor 120. As illustrated in FIG. 1, the speculative execution controller 125 can signal 124 to the instruction orderer 121 that the instruction orderer 121 is now allowed to speculatively reorder the load instruction 141 in the software application 112 to occur in the execution order before the store instruction 140, thus causing the instruction executor 123 to execute the load instruction 141 prior to execution of the store instruction 140.

Returning attention to step 203, if the speculative execution controller 125 determines that the speculation indicator 127-1 indicates that speculative execution of load instructions is not allowed in the processor 120, processing proceeds to step 205. An example of this may occur when a programmer or a compiler provides another occurrence of the SET SI instruction 150 in the code to set the value of the speculation indicator 127-1 to "off" or "0" or to some numerical value indicating that speculative execution of load instructions is not to be allowed in the processor.

In step 205, the speculative execution controller 125 does not allow speculative execution of load instructions in the processor. To carry out this processing, the speculative execution controller 125 can signal 124 to the instruction orderer 121 that it should not reorder any store and load instructions 140, 141 for execution by the instruction executor 123. In this manner, speculative execution of the load instruction 141 can be disabled in the processor 120 based on the setting of the speculation indicator 127-1.

After the processor 120 performs either step 204 or step 205, execution of the application continues (e.g., step 200) and the processing steps 201 through 205 are repeated until the next occurrence of a set speculation indicator instruction 150 in the software application 112 code which affects the setting of the speculation indicator 127-1. In this manner, a compiler or a programmer can produce code in the software application 112 that can turn on and turn off speculative execution of load instructions on an as needed basis. Accordingly, when a compiler or a programmer begins to create or generate a portion of code for the software application 112 that contains or that might contain store and load instructions which reference related memory locations in the memory 110, the compiler or the programmer can insert a set speculation indicator (SET SI) instruction 150 which can turn off the ability of the processor 120 to reorder the store and load instructions 140 and 141, thus avoiding a read-after-write hazard or a memory reference or access violation.

According to the foregoing description, the speculative execution controller 125 makes the decision of whether to allow or not allow the instruction orderer 121 to speculatively reorder for execution the load and store instructions 140, 141 based upon the value of the speculation indicator 127-1. If the speculation indicator 127-1 is set to a positive or true value (e.g., set to "1"), then the speculative execution controller 125 allows the instruction orderer 121 to reorder the load and store instructions 141, 140 as illustrated in FIG. 1.

Figure 3:
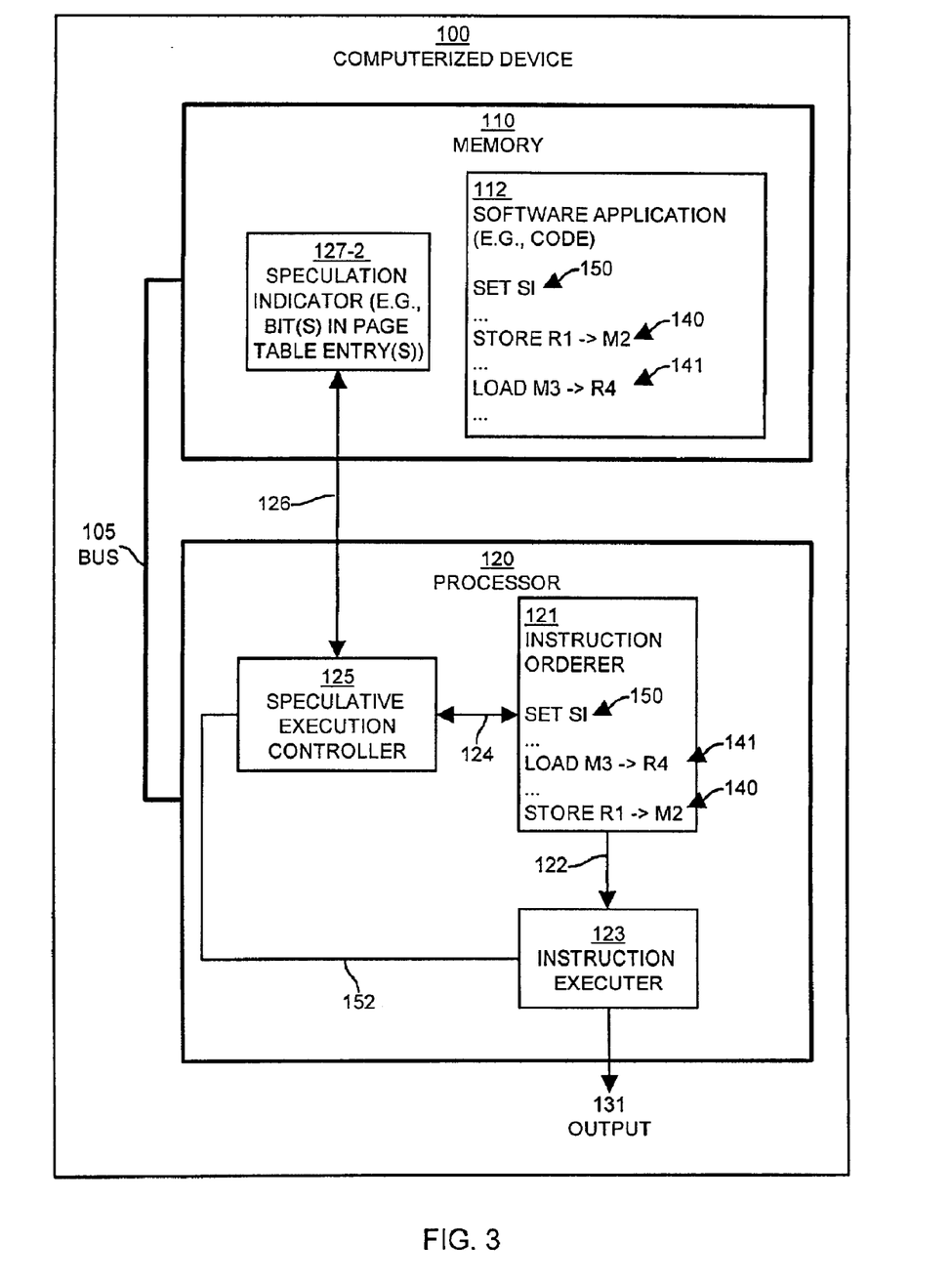
FIG. 3 illustrates another example architecture of a computerized device configured in accordance with another embodiment of the invention.

FIG. 3 illustrates an example of a computerized device 100 configured according to another embodiment of the invention. The operation of the example embodiment of the invention illustrated in FIG. 3 is similar to the operation of the embodiment of the invention illustrated in FIG. 1 as previously discussed, except that the speculation indicator 127-2 in this example is contained within the memory 110, as opposed to being included within the processor 120 (e.g., as a control register as shown in FIG. 1). For the embodiment illustrated in FIG. 3 then, in step 202 of the flow chart in FIG. 2, the speculative execution controller accesses the speculation indicator 127-2 in the memory 110 to determine if the processor can speculatively execute load instructions.

The speculation indicator 127-2 in FIG. 3 may be, for example, one or more bits associated with one or more respective page table entries in a page table within the memory 110. The speculation indicator bit or bits may be associated with instruction or code pages in the memory 110 or with data pages in the memory 110. Generally, a page table entry provides a range of memory addresses within the memory 110 that contain instructions for the code of the software application 112 or that reference a range or page of data in memory. The instruction orderer 121 can use a page table from the memory 110 to determine where to obtain instructions for the software application 112 within the memory 110.

According to one embodiment of the invention, if the speculation indicator 127-2 for a particular page of memory is set (i.e., is "on"), then the speculative execution controller 125 allows the processor 120 to speculatively reorder and execute instructions such as load and store instructions that may occur or exist anywhere within that respective page in the memory 10 as identified by that page table entry that has the speculation indicator 127-2 set or enabled. Accordingly, in this embodiment of the invention, certain pages in memory can have the speculation indicator 127-2 in their respective page table entry set to "on" to allow speculative execution of instructions in code residing in those pages in memory, while other pages of code for the same or a different software application 112 in the memory 110 can have their associated speculation indicators 127-2 set to "off," in which case the processor 120 is not allowed to speculatively execute any instructions such as loads in the code existing within those pages in the memory 110.

In another embodiment, page table entries for data (as opposed to code) can include a speculation indicator 127-2. In such cases, if the speculation indicator 127-2 indicates that speculation is allowed for a data page, then instructions that reference any data within that page (e.g., a load instruction) may be speculatively executed. If the speculation indicator 127-2 indicates that speculation is not to be allowed for data in that page, then instructions that reference any data within that page (e.g., a load instruction) may not be speculatively executed.

Figure 4:
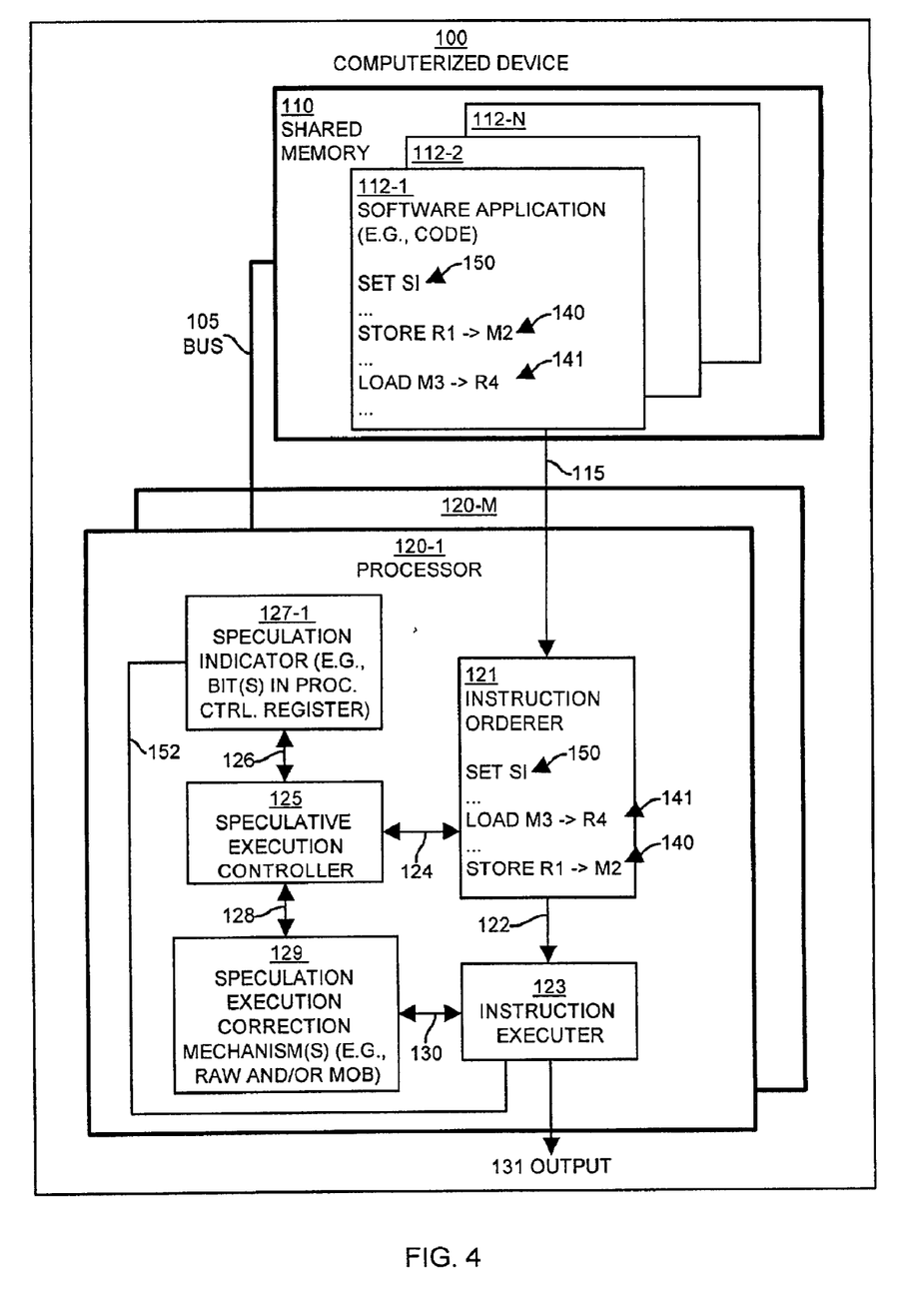
FIG. 4 illustrates another example architecture of the computerized device configured in accordance with another embodiment of the invention that operates a multiaccess execution environment.

FIG. 4 illustrates another example of a computerized device 100 configured according to one embodiment of the invention. In this example embodiment of the invention, the computerized device 100 operates a multiaccess execution environment and includes multiple processors 120 through 120-M. Each processor 120 is configured in a manner similar to the processor 120-1 shown in detail. In addition to the components discussed above with respect to the embodiment in FIG. 1, the processors 120 in the embodiment in FIG. 4 further include one or more speculation execution correction mechanisms 129 are coupled to the speculative execution controller 125 and to the instruction executor 123. The speculation execution correction mechanisms 129 in FIG. 4 represent either one or both of: i) read-after-write checking and error correction circuitry; and/or ii) a memory order buffer capable of detecting and connecting memory order violations which may occur as a result of speculatively executing load instructions in a multiaccess execution environment such as that illustrated.

Also in this example, the memory 110 contains multiple software applications 112-1 through 112-N. Each software application 112 represents either a distinct software process or represents one thread of a multi-threaded software application collectively represented by software applications 112-1 through 112-N. The software applications 112 thus represent multiple concurrently executable processes and/or threads. Each separate application 112 can independently and concurrently execute within one or more of the processors 120, thus creating a multiaccess execution environment within the computerized device 100. The memory 110 illustrated in FIG. 4 is also a shared memory that one or more of the software applications 112 can potentially access (e.g., read from or write to) at common or shared memory locations. The shared memory 110 allows the software applications 112 to perform interprocess communication and/or synchronization techniques.

Generally, the embodiment of the invention illustrated in FIG. 4 operates in a manner similar to the embodiments of the invention described with respect to FIGS. 1 through 3. In addition however, the speculative execution controller 125 can enable or disable one or more of the speculation execution correction mechanisms 129 upon the occurrence of certain conditions or depending upon specific configurations of the architecture of the processor 120.

The general operation of the computerized device 100 illustrated in FIG. 4 will now be explained with reference to the processing steps illustrated in FIG. 5. Thereafter, a flow chart of processing steps illustrated in FIG. 6 provides an example of various conditions that different embodiments of the invention can detect and process to enable or disable the speculative execution correction mechanisms 129 according to various embodiment of the invention.

Figure 5:
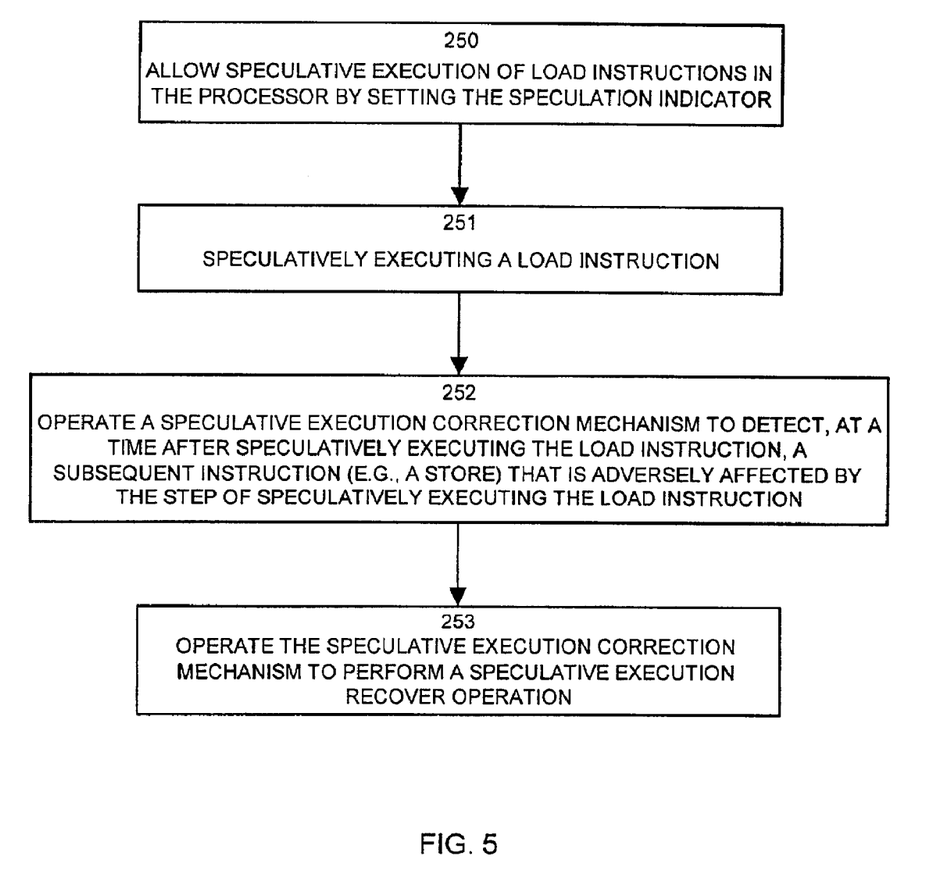
FIG. 5 is a flow chart of processing steps performed according to one embodiment of the invention that can operate a speculative execution correction mechanisms to recover from hazards or faults which occurs a result of speculatively executed load instructions.
Figure 6:
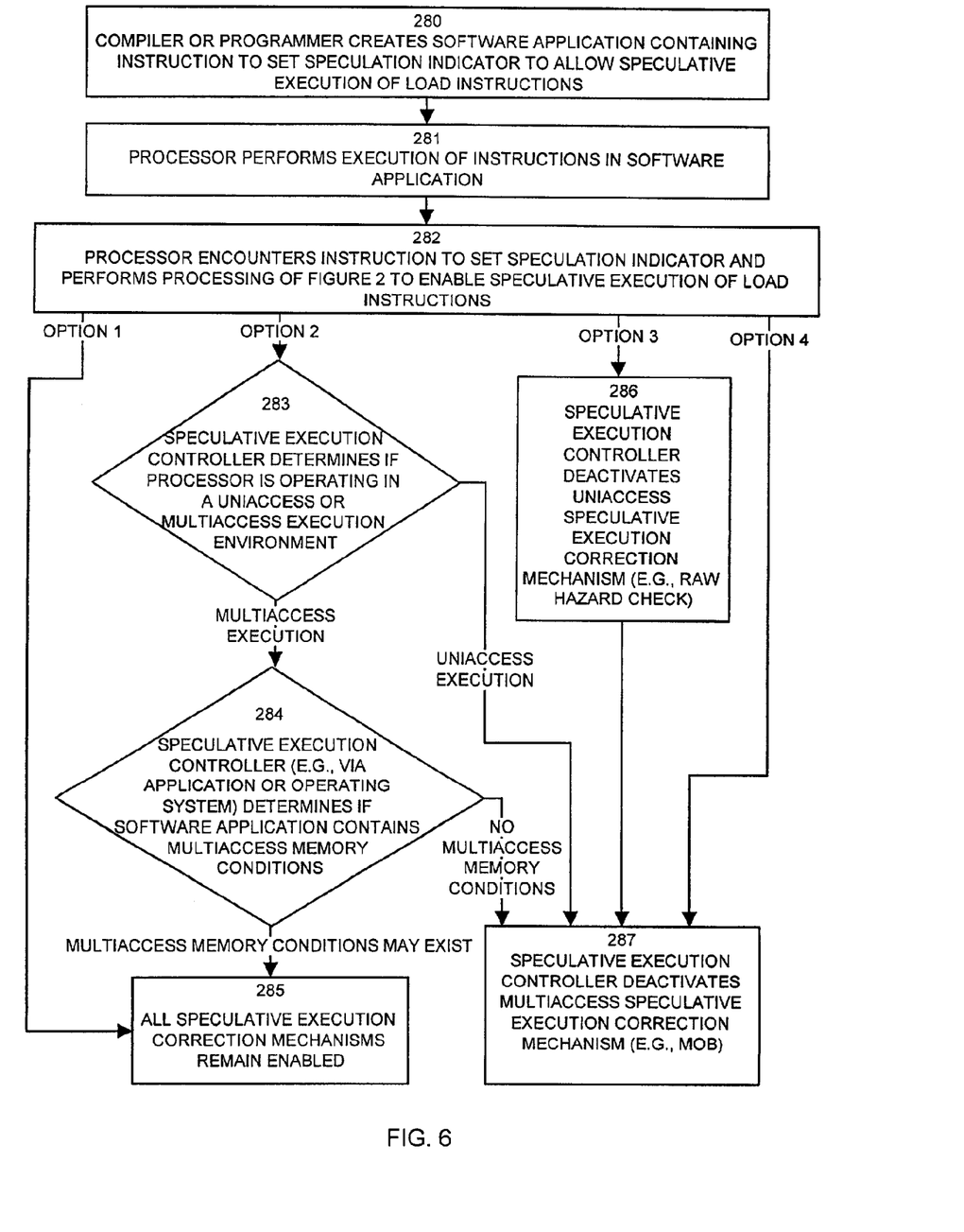
FIG. 6 is a flow chart of processing steps which shows processing of various embodiments of the invention that depend upon conditions existing within the computerized device.

FIG. 5 illustrates a flow chart of processing steps which show the general operation of the embodiment of the invention illustrated in FIG. 4.

In step 250, a processor 120 (i.e., one of processors 120-1 through 120-M) allows speculative execution of load instructions within the processor 120 by setting the speculation indicator 127 (127-1 within the processor 120 in this example, though it is to be understood that the speculation indicator 127-2 in FIG. 3 could be used as well for this example). This may occur as illustrated above with respect to the processing in FIG. 2 in which the processor 120 executes the "set speculation indicator" instruction SET SI 150 that causes the speculative execution controller 125 to set the value of the speculation indicator 127-1 to indicate that speculative execution of load instructions is now allowed in the processor 120.

Next, in step 251, the processor speculatively executes a load instruction. As this example embodiment of the invention in FIG. 4 illustrates, since speculative execution of load instructions is now enabled due to the processing of step 250, the instruction orderer 121 reorders the load instruction 141, which originally appeared in the software application 112-1 after the store instruction 140, to now appear before the store instruction 140. In other words, the instruction orderer 121 moves the load instruction 141 ahead of the store instruction 140 in the list of instructions to be executed by the instruction executor 123. Thereafter, the instruction executor 123 executes (speculatively) the load instruction 141 to produce the output 131.

In step 252, the processor 120 operates the speculation execution correction mechanism(s) 129 to detect, at a time after speculatively executing the load instruction 141, a subsequent instruction (e.g., the store instruction 140) that is adversely affected by the step of speculatively executing the load instruction 141. Perhaps the operation of speculatively executing the load instruction 141 causes output 131 that indicates the existence of a read-after-write hazard which occurs with respect to a memory location referenced by the load and/or store instructions 140 and 141. Alternatively, another process or thread 112 operating in the multiaccess execution environment shown in FIG. 4 may attempt to access a memory location that the store instruction 140 attempts to access and thus the speculative execution of the load instruction 141, which also may access a related memory location, causes a memory order violation to occur which adversely affects the subsequently executed store instruction 140. In other words, assume for this example that the operation of speculatively executing the load instruction in step 251 causes a read-after-write hazard or a memory order violation to occur (i.e., either being an adverse effect of a subsequent instruction in this or another process) with respect to the processor 120 in the computerized device 100. Accordingly, in step 252, the speculation execution correction mechanism detects such a problem.

In response, in step 253, the processor 120 operates the speculation execution correction mechanism 129 to perform a speculative execution recover operation. If the speculative execution of the load instruction 141 causes a read-after-write hazard to occur, in step 253 the processor 120 can operate read-after-write error checking and correction circuitry represented by the speculation execution correction mechanism 129 in order to cancel and restart (e.g., re-execute in the original order) the affected instructions within the application code 112. Alternatively, if a memory order violation occurred as a result of another process or thread 112 being adversely affected by the speculative execution of the load instruction 141, then the processor 120 can operate a memory order buffer structure represented by the speculation execution correction mechanism 129 in order to correct the memory order violation.

In this manner, the processing shown in FIG. 5 allows a process or thread to turn a processor's ability to speculatively execute load instructions and relies upon the speculation execution correction mechanisms 129 within the processor to recover from any hazards or memory order violations which may occur as a result. The processing shown in FIG. 5 thus operates as a safety net by allowing a compiler or a programmer to insert instructions to enable speculative execution of load instructions while at the same time detecting and correcting any errors or circumstances in which such speculative execution causes memory order or hazard problems.

It may be the case that certain uses of the computerized device 100 justify limiting or disabling the use of one or more speculation execution correction mechanisms 129. As an example, consider a situation in which a programmer is developing a software application 112 by writing assembly language instructions by hand in order to optimally create the software application 112 for the fastest performance possible. The programmer thus has the intimate knowledge of the complete operation or the design of the software application 112. As such, the programmer will be aware of the memory references which each instruction in the application 112 references or uses. Due to the programmers ability to precisely define the operation of the software application 112, the programmer may know ahead of time that it is impossible for the operation of the program to incur or produce situations that result in read-after-write hazards or memory order violations. It may be the case, for example, that the programmer develops a simple software application 112 that is designed to only operate in a uniaccess execution environment in which the programmer has foreknowledge to avoid hazards. In such situations, it may be desirable to provide the programmer with the ability to completely disable operation of the speculation execution correction mechanism in order to conserve processing resources such as power consumption. In another configuration, it may be desirable to develop a specific processor 120 which does not contain circuitry that provides speculation execution correction mechanisms 129. This type of processor is shown by the embodiments of the invention illustrated in FIGS. 1 and 3.

Since designing and fabricating custom processors 120 is an expensive endeavor, it may be likely that a programmer will develop software applications 112 for a processor that does contain speculation execution correction mechanisms 129. In such cases, other embodiments of the invention may provide processors that include the ability to enable and disable such speculation execution correction mechanisms 129 in certain instances. As an example, since a memory order buffer in a conventional processor operates continuously whether or not that processor happens to be operating in a multiaccess execution environment, a conventional memory order buffer continuously consumes power and processing cycles in order to track write accesses to memory locations.

According to one embodiment of the invention, since a programmer or a compiler is capable of controlling when the processor 120 is and is not allowed to speculatively executes load instructions, the speculative execution controller 125 can be configured to disable the speculation execution correction mechanism 129, for example, when speculative execution of load instructions is not allowed in the processor 120. In other words, since a memory order buffer is designed to provide corrective measures in the event of a memory order violation due to speculatively executing instructions in a processor 120, this embodiment of the invention provides the ability to turn off or disallow the processor from speculatively executing load instructions and the speculative execution controller 125 can also temporarily disable operation of a memory order buffer structure while speculative execution is also disabled, thus conserving processor power.

According to another embodiment of the invention, the speculative execution controller 125 can disable read-after-write hazard checking and correction circuitry as well as memory order buffer circuitry in cases where speculative execution of load instructions is disabled as well. In this manner, no such checking is performed when speculation is disabled. According to another alternative embodiment of the invention, in uniaccess execution environments when speculative execution of load instructions is enabled within a processor 120, it may still be desirable to deactivate or disable the memory order buffer structure since such circuitry is only useful in detecting multiaccess execution environment memory order violations.

FIG. 6 illustrates a flow chart of processing steps which convey various possible operations of a computerized device 100 configured according to respective embodiments of the invention. In particular, the flow chart of processing steps in FIG. 6 illustrates the operations of multiple embodiments of a computerized device 100 configured with a processor 120 as illustrated in FIG. 4. The different configurations or ways in which a processor 120 can operate are shown as different processing options in FIG. 6, as will be explained below.

In step 280, a compiler or programmer creates a software application 112 containing an instruction 150 to set the speculation indicator 127 (e.g., 127-1 or 127-2) to allow speculative execution of load instructions (e.g., 141) in a computerized device 100.

In step 281, the processor 120 performs execution of instructions in the software application 112. In other words, in step 281 the processor 120 executes the application 112.

Next, in step 282, the processor 120 encounters an instruction 150 to set the speculation indicator 127 and performs the processing discussed above with respect to FIG. 2 to enable speculative execution of load instructions in the processor 120. After processing of step 282 is complete, the processor 120 operates in a state in which load instructions may now be speculatively executed.

The remainder of the processing steps 283 through 287 shown in FIG. 6 illustrates various processing options or paths that a processor 120 configured according to various embodiments of the invention may perform. In other words, the options OPTION 1 through OPTION 4 represent various possible processing paths a processor may take depending upon which embodiment of the invention that processor 120 is configured. To this end, one embodiment of the invention is represented by a processor 120 configured to perform the processing of the path shown by OPTION 1, while another embodiment of the invention is represented by a processor 120 configured to perform the processing of the path shown by OPTION 2 and so on. Generally, the various options corresponding to different embodiments of the invention shown in FIG. 6 relate to whether or not speculative execution correction mechanisms 129 are enabled within the processor and, more particularly, relate to which specific speculation execution correction mechanisms 129 are enabled or disabled depending upon various conditions that may or may not be present.

OPTION 1 represents one embodiment of the invention in which a processor 120 performs step 285 to enable all speculative execution correction mechanisms 129 within the processor 120 after the processor is configured to allow speculative execution of load instructions (step 282). OPTION 1 thus represents the embodiment discussed above with respect to FIG. 4 and the flow chart of processing steps in FIG. 5.

Another embodiment of the invention is configured to follow the processing of OPTION 2 in which processing proceeds from step 282 to step 283. In step 283, the speculative execution controller 125 determines (e.g., is informed by software such as an operating system or an application) if the processor 120 is operating a uniaccess execution environment or in a multiaccess (e.g., multiprocessing or multiprocessor) execution environment. If the speculative execution controller determines that the processor 120 is operating a uniaccess execution environment, processing proceeds to step 287.

In step 287, the speculative execution controller 125 deactivates or disables a multiaccess speculative execution correction mechanism 129, which may be, for example, a memory order buffer. As discussed above, the memory order buffer structure in a processor 120 is not required to operate when a processor 120 is operating a uniaccess execution environment. This embodiment of the invention thus conserves processor power.

Returning attention to step 283, if the speculative execution controller 125 determines that the processor is operating a multiaccess execution environment, processing proceeds to step 284.

In step 284, the speculative execution controller 125 attempts to determine if the currently executing software application 112 contains multiaccess memory conditions.

As an example, the speculative execution controller 125 may attempt to determine if the software application 112 is bound to a single processor 120 and contains no references to any shared memory locations or memory locations that may be accessible by multiple entities (e.g., processes) within the computerized device. In such cases, it may be safe to assume that memory order violations which may occur as a result of other processes interfering with the currently executing process are not likely to happen. In step 284 then, if the speculative execution controller 125 determines that a multiaccess memory condition may exist for the software application 112, processing proceeds to step 285 which results in all speculative execution correction mechanisms 129 remaining enabled. In other words, in step 284, if the software application 112 operating in a multiaccess execution environment does access or reference shared memory locations, then hazard and memory order violation correction mechanisms remain enabled such that any speculatively executed load instructions which adversely affect subsequent instructions may be recovered from properly.

In step 284, if the speculative execution controller determines that no multiaccess memory conditions exist for the currently executing software application 112 within the processor 120, then processing proceeds to step 287 which, as discussed above, disables or deactivates any multiaccess speculative execution correction mechanisms 129 such as a memory order buffer.

OPTION 3 in FIG. 6 shows processing which may occur in a processor 120 configured according to another embodiment of the invention. In particular, after the processor 120 enables speculative execution of load instructions in step 282, OPTION 3 processing proceeds to step 286 at which point the speculative execution controller 125 deactivates any uniaccess speculative execution correction mechanisms 129 such as read-after-right hazard checking in correction circuitry within the processor 120. Thereafter, processing proceeds to step 287 which, as discussed above, causes the speculative execution controller 125 to also deactivate any multiaccess speculative execution correction mechanisms 129 such as memory order buffer circuitry within the processor 120.

An embodiment of the invention configured to operate according to OPTION 3 provides no read-after-right hazard or memory violation access checking. As discussed with respect to the example above, such an embodiment of the invention may be useful in limited circumstances, such as for example, when the programmer or a compiler can be absolutely sure that no read-after-right hazard checks need to take place and in which no memory order violations can possibly occur for the software application 112. In such instances, a processor 120 configured according to this embodiment of the invention can conserve even more processing resources since no speculation execution correction mechanisms need to operate while speculation is enabled. One implementation of such an embodiment of the invention is illustrated by the example configurations of computerized devices 100 shown in FIGS. 1 and 3 which do not contain any speculation execution correction mechanisms.

OPTION 4 represent the processing performed by a processor 120 configured according to another embodiment of the invention in which, after speculative execution of load instructions is enabled in step 282, processing proceeds directly to step 287 where the speculative execution controller 125 deactivates only the multiaccess speculative execution correction mechanism 287. In such an embodiment, the uniaccess speculative execution correction mechanisms 129, such as read-after-right hazard checking and correction circuitry, remain enabled. As such, operation of this embodiment of the invention is able to recover the from hazards which occur by speculatively executing load instructions 141 prior to store instructions 140 within the same software application 112. However, this embodiment of the invention will not be able to recover from any memory order violations which may occur as a result of operating the software application 112 in a multiaccess execution environment during which shared memory is interfered with by another processor during or after the operation of speculatively executing a load instruction. In other words, the embodiment of the invention represented by OPTION 4 is useful in situations where the compiler or programmer are certain that the software application 112 only operates in a uniaccess execution environment. It is to be understood that for processors 120 designed for dedicated uniaccess execution environments, another embodiment of the invention includes a processor 120 in which the memory order buffer is completely eliminated from the processor architecture, thus saving processor real estate, processor manufacturing costs and processor power consumption.

From the foregoing discussion of embodiments of the invention, those skilled in the art will understand that the embodiments of the invention provide a mechanism to control when a processor performs speculative execution of instructions. It is to be understood that there can be many variations made to the embodiments explained above while still achieving the same objective of those embodiments and the invention in general. For example, the various options or processing paths shown in the flow chart in FIG. 6 can represent specific processor architectures or designs, or alternatively, a processor 120 can be configured to support all of the options illustrated in FIG. 6.

In such an embodiment of the invention, the particular processing specifics associated with each respective option in FIG. 6 may be selected or enabled, for example, by having the compiler or a programmer insert a specific "set speculation indicator" instruction 150 into the software application 112 to identify which option the compiler or programmer desires to have enabled. As an example, the set speculation indicator instructions 150 may include an operand which identifies which option or processing paths the processor 120 is to perform during the enablement of speculative execution of load instructions. As a specific example, if a compiler or programmer develops the software application 112 and wants the software application to operate according to the embodiment shown by OPTION 3 in FIG. 6, the compiler or software programmer might insert a set speculation indicator instruction 150 that appears as "SET SI NONE." The "NONE" operand, which is part of the set speculation indicator instruction 150, indicates to the processor 120 that no speculative execution correction mechanisms 129 are to be enabled during execution of the software application 112. Other operands could be specified in the instruction encoding of the set speculation instruction 150 to identify other operational modes indicated by the other various options discussed above with respect to FIG. 6. In this manner, a processor may be configured to operate according to multiple embodiments of the invention and the particular way in which such a processor operates may be selectable by a compiler, by an operating system or by a programmer by choosing an appropriate instruction 150 which sets the speculation indicator 127 to, for example a numerical value, to enable speculative execution of load instructions in a computerized device 100 and to enable or disable certain hazard or memory violation correction features within the processor 120.

In another embodiment, a speculation indicator 127-2 exists for each page of data and/or code in memory 110. If the memory is shared memory as in this example, execution of speculative instructions such as loads might be suppressed (e.g., by setting the speculation indicator to false or 0) for shared or multiaccess pages since multiple processes might happen to access these areas in memory. In an alternative embodiment however, if a page or pages in memory is/are not shared, then the speculation indicator 127-2 might be set for that page or pages to allow speculation for instructions (or data) contained in, or that reference data in, that page or in those code or data pages.

In other embodiments, the speculation execution controller 125 can consult the speculation indicator 127-2 in a page table associated with the set of instructions executing on the processor in the computerized device. For instance, the page table can contain page table entries for data pages that contain the addresses of data referenced by the instructions (e.g., addresses of instruction operands) in the application 112. Alternatively, the page table entries that contain the speculation indicator 127-2 are page table entries for code pages for the application code. The speculation indicator 127-2 could thus be associated with a code page containing the load instruction, a code page containing the store instruction, a data page containing the load instruction, a data page containing the store instruction, or some combination thereof.

In another alternative embodiment, the speculative execution controller 125 can obtain speculation indicator 127 inputs from a number of sources. For example, the page table entries (e.g., 127-2) could be used in addition to processor control register values that represent the speculation indicator 127-1 and the speculative execution controller 125 can use a policy that combines each speculation indicator 127-1 and 127-2 for example by using a Boolean equation to form a single speculation indicator value 127 (e.g., 127-1 AND 127-2, 127-1 OR 127-2, and so forth) indicating if speculation is or is not to be allowed for a particular application, page of data or code, or for a particular set of one or more instructions.

In some computerized devices, memory pages that store application code are often shared among many processors simultaneously and such code pages are marked read-only. In such computerized device systems, data pages are less often shared and are marked as read-write in the page table. Accordingly, in another embodiment, a page table entry associated with an address of the load operand can contain a speculation indicator 127-2 that controls or indicates whether or not speculative execution is allowed. In other words, the page table entry for the page containing this address indicates if the load is eligible to "move up" and bypass prior store operations.

In another alternative embodiment, the processor 120 can assume all loads are allowed to be executed in a speculative manner, but a page table entry containing a speculation indicator 127-2 associated with a page containing a store instruction can cancel or inhibit a prior speculative load. Stated differently, in this embodiment, a load cannot be speculatively executed before a store when the store instruction exists in, or contains, an operand referencing data within a page having a page table entry indicating that speculative execution of that load is not allowed.

In another alternative embodiment, the processor 120 can check pairs of store and load instructions to see if the load can bypass the store and be speculatively executed. The speculative execution controller 125 can make a decision to permit the bypass based on a function of the page table entries for both the load and store operands (e.g., for pages containing these instructions, or for pages containing data referenced by operands to these instructions). As an example, suppose the speculation indicator 127-2 for each page table entry indicates if the page is public in which speculation is not allowed or is private in which speculation is allowed. As an example, a "public" speculation indicator 127-2 for a page table entry means that the page of code or data for that page table entry will not be accessed simultaneously by multiple processors 120. In this example, the speculative execution controller 125 can allow or permit a load to bypass a store according to the following table:

| Store Page | Load Page | Allow or not allow load to bypass store |
|---|---|---|
| Public | Public | Do no allow load to bypass store |
| Public | Private | Allow load to bypass store |
| Private | Public | Allow load to bypass store |
| Private | Private | Allow load to bypass store |

In this manner, this embodiment considers multiple speculation indicators (which happen to be page table entry speculation indicators 127-2 in this example) and uses a policy scheme to determine when and when not to allow speculative execution of instructions in a computerized device.

Such variations are intended to be covered by the scope of this invention. As such, the foregoing description of embodiments of the invention are not intended to be the limiting. Rather, any limitations to the invention are presented in the following claims.

What is claimed is:

1. In a computerized device, a method for controlling speculative execution of instructions, the method comprising the steps of:
    executing a set of instructions on a processor in the computerized device; wherein the processor in the computerized device operates a uniaccess execution environment;
    setting the value of a speculation indicator to indicate that speculative execution of load instructions is allowed in the computerized device;
    detecting the value of the speculation indicator;
    based on the value of the speculation indicator indicating that speculative execution of instructions is allowed in the computerized device, allowing speculative execution of instructions in the processor, wherein the step of allowing speculative execution of load instructions in the processor comprises the step of deactivating a multiaccess speculative execution correction mechanism in the computerized device.

2. The method of claim 1 further comprising the steps of:
    setting the value of the speculation indicator to indicate that speculative execution of load instructions is not allowed in the computerized device; and
    based on the value of the speculation indicator indicating that speculative execution of instructions is allowed in the computerized device, deactivating at least one speculative execution correction mechanism in the computerized device.

3. The method of claim 2 wherein the processor in the computerized device operates a uniaccess execution environment and wherein the step of deactivating at least one speculative execution correction mechanism in the computerized device comprises the steps of:
    deactivating a uniaccess speculative execution correction mechanism; and
    deactivating a multiaccess speculative execution correction mechanism.

4. The method of claim 1 further comprising the steps of:
    setting the value of the speculation indicator to indicate that speculative execution of load instructions is allowed in the computerized device.

5. The method of claim 1, wherein the step of allowing speculative execution of load instructions in the processor comprises the steps of:
    speculatively executing a load instruction in the processor;

detecting, at a time after speculatively executing the load instruction, a subsequent instruction which is adversely affected by the step of speculatively executing the load instruction; and performing a speculative execution recover operation.

6. The method of claim 5 wherein:

the computerized device operates a multiaccess execution environment;

the step of detecting a subsequent instruction which is adversely affected by the step of speculatively executing the load instruction compromises a step of operating a multiaccess speculative execution correction mechanism that detects a memory reference by a subsequent instruction in the multiaccess execution environment that is adversely affected by the step of speculatively executing the load instruction; and the step of performing a speculative execution recover operation comprises the step of performing a multiaccess speculative execution recover operation.

7. The method of claim 5 wherein:

the subsequent instruction is a store instruction containing a memory reference related to the speculatively executed load instruction; and the step of performing a speculative execution recover operation comprises the step of performing a uniaccess speculative execution recover operation.

8. The method of claim 5 wherein the step of speculatively executing a load instruction in the processor includes the steps of:

detecting the load instruction following the subsequent instruction in the set of instructions being executed on the processor; and executing the load instruction prior to executing the subsequent instruction.

9. A processor configured to control speculative execution of load instructions, the processor being configured to operate a uniaccess execution environment and comprising:

an instruction orderer configured to receive and order a set of instructions for execution;

an instruction executer coupled to the instruction orderer, the instruction executer configured to execute instructions in the set of instructions according to an order indicated by the instruction orderer;

a speculation indicator configured to receive and maintain a value that indicates if speculative execution of instructions is allowed in the processor; and a speculative execution controller coupled to at least one of the instruction orderer and the instruction executer and coupled to the speculation indicator, the speculative execution controller configured to detect the value of a speculation indicator and configured to allow speculative execution of instructions in the processor if the value of the speculation indicator indicates that speculative execution of instructions is allowed in the processor, and configured to not allow speculative execution of instructions in the processor if the value of the speculation indicator indicates that speculative execution of instructions is not allowed in the processor, wherein the speculative execution controller is configured to deactivate a multiaccess speculative execution correction mechanism in the computerized device.

10. The processor of claim 9 further wherein:

at least one of the instruction executer and the speculative execution controller is configured to set the value of the speculation indicator to indicate that speculative execution of load instructions is not allowed in the processor; and wherein the speculative execution controller is configured to deactivate at least one speculative execution correction mechanism coupled to the instruction executer.

11. The processor of claim 10 wherein:

the processor is configured to operate a uniaccess execution environment; and wherein the speculative execution controller is configured to deactivate a uniaccess speculative execution correction mechanism and is configured to deactivate a multiaccess speculative execution correction mechanism.

12. The processor of claim 9 wherein at least one of the instruction executer and the speculative execution controller is configured to set the value of the speculation indicator to indicate that speculative execution of load instructions is allowed in the processor.

13. The processor of claim 12 wherein when the speculative execution controller is configured to allow speculative execution of load instructions in the processor:

the instruction order is configured to speculatively reorder a load instruction and the instruction executer is configured to speculatively execute the load instruction;

the speculative execution correction mechanism is configured to detect, at a time after the instruction executer speculatively executes the load instruction, a subsequent instruction which is adversely affected by speculatively executing the load instruction; and the speculative execution correction mechanism is configured to perform a speculative execution recover operation.

14. The processor of claim 13 wherein:

the subsequent instruction is a store instruction containing a memory reference related to the speculatively executed load instruction; and wherein the speculative execution correction mechanism is configured to perform a uniaccess speculative execution recover operation.

15. The processor of claim 13 wherein:

the instruction orderer is configured to detect the load instruction following the subsequent instruction in a set of instructions being executed on the processor and is configured to reorder the load instruction prior to the subsequent instruction; and wherein the instruction executer is configured to execute the load instruction prior to executing the subsequent instruction.

16. The processor of claim 13 wherein:

the processor is configured to operate in a multiaccess execution environment;

the speculative execution correction mechanism is a multiaccess speculative execution mechanism configured to detect a memory reference by a subsequent instruction in the multiaccess execution environment that is adversely affected by the instruction executer speculatively executing the load instruction; and the multiaccess speculative execution correction mechanism is configured to perform a multiaccess speculative execution recover operation.

* * * * *

UNITED STATES PATENT AND TRADEMARK OFFICE
CERTIFICATE OF CORRECTION

PATENT NO.    : 6,854,048 B1
DATED         : February 8, 2005
INVENTOR(S)   : David Dice It is certified that error appears in the above-identified patent and that said Letters Patent is hereby corrected as shown below:

<u>Title page,</u>
Item [74] *Attorney, Agent or Firm*, "Barry W. Chaplin, Esq." should read
-- Barry W. Chapin, Esq. --

Signed and Sealed this

Twenty-fourth Day of May, 2005

JON W. DUDAS
*Director of the United States Patent and Trademark Office*